United States Patent
Ichikawa et al.

(10) Patent No.: US 7,029,511 B2
(45) Date of Patent: Apr. 18, 2006

(54) SI-CONTAINING HONEYCOMB STRUCTURE AND PROCESS FOR PRODUCTION THEREOF

(75) Inventors: Shuichi Ichikawa, Handa (JP); Takashi Harada, Nagoya (JP); Aiko Otsuka, Okazaki (JP); Yukihisa Wada, Nisshin (JP); Yoshinori Yamamoto, Nishikamo-gun (JP)

(73) Assignee: NGK Insulators, Ltd., Nagoya (JP)

( * ) Notice: Subject to any disclaimer, the term of this patent is extended or adjusted under 35 U.S.C. 154(b) by 238 days.

(21) Appl. No.: 10/474,309

(22) PCT Filed: Jan. 24, 2003

(86) PCT No.: PCT/JP03/00621

§ 371 (c)(1),
(2), (4) Date: Oct. 7, 2003

(87) PCT Pub. No.: WO03/062611

PCT Pub. Date: Jul. 31, 2003

(65) Prior Publication Data

US 2004/0118095 A1    Jun. 24, 2004

(30) Foreign Application Priority Data

Jan. 25, 2002    (JP)    .............................. 2002-017366

(51) Int. Cl.
*B01D 39/20*    (2006.01)
*C04B 38/00*    (2006.01)

(52) U.S. Cl. .................. 55/523; 502/439; 502/527.19; 423/345; 501/88; 264/682

(58) Field of Classification Search .............. 55/523, 55/DIG. 5, DIG. 30; 502/232, 439; 423/324, 423/345; 428/116; 501/88; 264/682
See application file for complete search history.

(56) References Cited

U.S. PATENT DOCUMENTS 4,335,783 A    6/1982    McBrayer et al.

(Continued)

FOREIGN PATENT DOCUMENTS

EP    0 753 490 A1    1/1997

(Continued)

OTHER PUBLICATIONS

Suresh T. Gulati; Strength and Thermal Shock Resistance of Segmented Wall-Flow Diesel Filters; pp 11-18.

*Primary Examiner*—Frank M. Lawrence
(74) *Attorney, Agent, or Firm*—Oliff & Berridge, PLC

(57) ABSTRACT

A honeycomb structure 1 has a large number of through-holes 3 divided by partition walls 2 and extending in the axial direction, characterized in that the honeycomb structure contains a Si phase having a lattice constant controlled at 0.54302 to 0.54311 nm at room temperature. A process for producing the honeycomb structure 1, includes a firing step of firing a precursor of honeycomb structure, wherein the precursor contains a Si phase and the firing step is conducted using a furnace material free from any boron-containing compound. A process for producing the honeycomb structure 1, includes a firing step of firing a precursor of honeycomb structure, wherein a reduction percentage of Si content in Si phase after firing step relative to Si content in Si phase before firing step is suppressed at 10% by mass or less. Having an improved thermal conductivity, the honeycomb structure is superior in thermal shock resistance.

9 Claims, 2 Drawing Sheets

U.S. PATENT DOCUMENTS

| | | | |
|---|---|---|---|
| 5,145,825 A * | 9/1992 | Deeba et al. | 502/242 |
| 5,733,352 A | 3/1998 | Ogawa et al. | |
| 6,764,742 B1 * | 7/2004 | Ichikawa et al. | 428/116 |
| 2003/0007905 A1* | 1/2003 | Tanaka et al. | 422/180 |
| 2005/0124483 A1* | 6/2005 | Morimoto et al. | 501/88 |

FOREIGN PATENT DOCUMENTS

| | | |
|---|---|---|
| JP | B2 61-51240 | 11/1986 |
| JP | A 8-28246 | 1/1996 |
| JP | B2 8-13706 | 2/1996 |
| JP | A 2001-10871 | 1/2001 |
| WO | WO00/68941 | 11/2000 |
| WO | WO 01/70373 A1 | 9/2001 |

\* cited by examiner

FIG.1
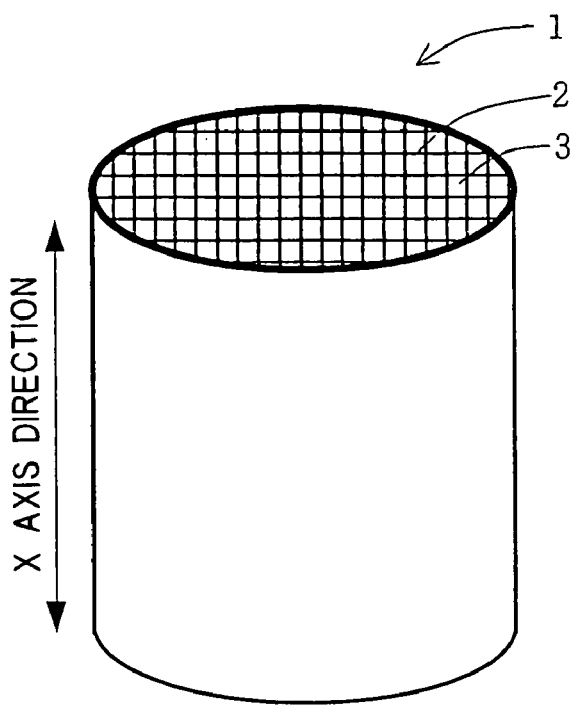
FIG.2(a)  FIG.2(b)
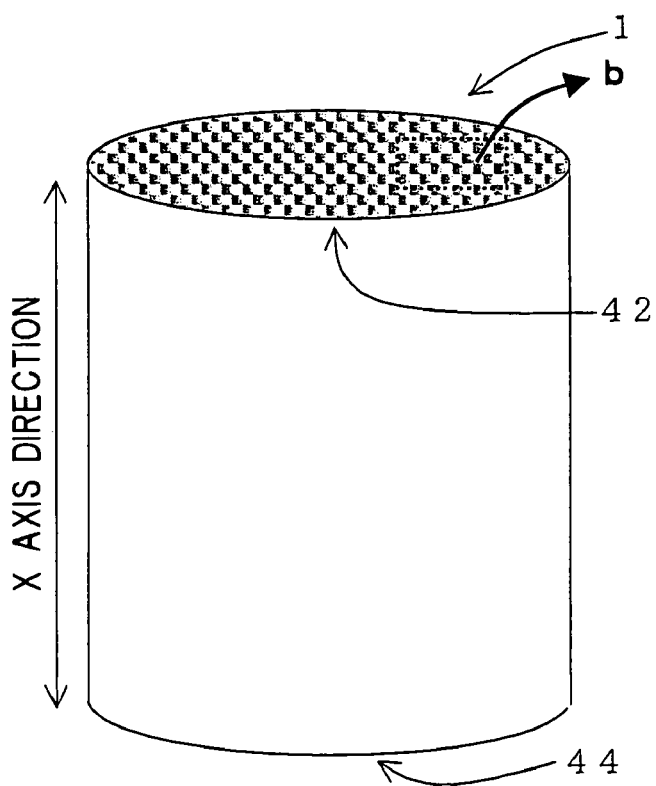
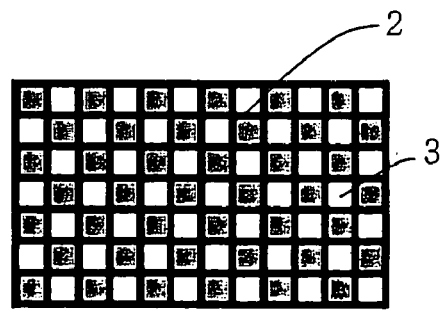

SI-CONTAINING HONEYCOMB STRUCTURE AND PROCESS FOR PRODUCTION THEREOF

TECHNICAL FIELD

The present invention relates to a honeycomb structure used, for example, in a filter for capturing fine particles present in an exhaust gas emitted from an internal combustion engine, a boiler or the like, or in a catalyst carrier, as well as to a process for producing the honeycomb structure. More particularly, the present invention relates to a honeycomb structure superior in thermal conductivity and a process for production thereof.

BACKGROUND ART

Honeycomb structures are in use, for example, in a filter for capturing fine particles present in an exhaust gas emitted from an internal combustion engine, a boiler or the like, particularly diesel fine particles, as well as in a carrier for exhaust gas purification catalyst.

Honeycomb structures used, for example, as a filter generally have, as shown in FIGS. 2(a) and 2(b), a large number of through-holes 3 divided by partition walls 2 and extending in the X-axis direction, wherein each through-hole 3 is plugged at either end of the hole and adjacent through-holes 3 are plugged alternately at each end of the structure so that each end of the structure looks a checkerboard pattern. In a honeycomb structure having such a constitution, a to-be-treated fluid, for example, enters, at one end 42 of the structure, those through-holes 3 which are not blocked at the end 42 but are blocked at other end 44, passes through porous partition walls 2, and is discharged from adjacent through-holes 3 which are blocked at the one end 42 but not blocked at the other end 44. At this time, the partition walls 2 function as a filter and, for example, a soot emitted from a diesel engine is captured by the partition walls and deposits thereon. In the honeycomb structure used for such a purpose, the sharp temperature change of exhaust gas and the local heating makes non-uniform the temperature distribution inside the honeycomb structure and there have been problems such as thermal stress generation in honeycomb structure, crack formation and the like. When the honeycomb structure is used particularly as a filter for capturing a particulate substance in an exhaust gas emitted from a diesel engine (this filter is hereinafter referred to as DPF), it is necessary to burn the fine carbon particles accumulated on the filter to remove the particles and regenerate the filter; in this case, high temperatures are generated locally in the filter, this non-uniform temperature distribution during regeneration produces a big thermal stress, and cracks have tended to arise.

Hence, there were proposed processes for producing a honeycomb structure by bonding a plurality of individual honeycomb segments using an adhesive. In, for example, U.S. Pat. No. 4,335,783 is disclosed a process for producing a honeycomb structure, which comprises bonding a large number of honeycomb parts using a discontinuous adhesive. Also in JP-B-61-51240 is proposed a heat shock-resistant rotary regenerating heat exchanging method which comprises forming, by extrusion, matrix segments of honeycomb structure made of a ceramic material, firing them, making smooth, by processing, the outer peripheral portions of the fired segments, coating the to-be-bonded areas of the resulting segments with a ceramic adhesive having, when fired, substantially the same mineral composition as the matrix segments and showing a difference in thermal expansion coefficient, of 0.1% or less at 800° C., and firing the coated segments. Also in a SAE article 860008 of 1986 is disclosed a ceramic honeycomb structure obtained by bonding cordierite honeycomb segments with a cordierite cement. Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles.

By thus adopting a segmentalized honeycomb structure, cracks formation caused by thermal stress can be prevented to some extent. However, if there is developed a honeycomb structure made of a material having an improved thermal conductivity, local appearance of high temperatures can be prevented and a practical thermal shock resistance can be achieved without reducing the number of segments or even without adopting a segmentalized honeycomb structure.

Meanwhile, with respect to the material of honeycomb structure, use of a Si—SiC type material in DPF is proposed in JP-B-8-13706. In the literature, it is disclosed that the material is superior in heat resistance, thermal shock resistance and oxidation resistance. However, the literature makes no mention on the thermal conductivity of the material.

DISCLOSURE OF THE INVENTION

The present invention has been made in view of the above situation. The present invention aims at providing a honeycomb structure superior in thermal shock resistance by improvement in thermal conductivity of honeycomb structure.

The present invention provides firstly a honeycomb structure having a large number of through-holes divided by partition walls and extending in the axial direction, characterized in that the honeycomb structure contains a Si phase having a lattice constant controlled at 0.54302 to 0.54311 nm at room temperature (the first aspect).

In the first aspect of the present invention, the Si phase is preferred to contain boron in an amount of 0.02% by mass or less. The honeycomb structure is preferred to further contain refractory particles as an aggregate, and the refractory particles are preferred to be SiC. Also, the honeycomb structure is preferred to be porous.

The present invention provides secondly a process for producing a honeycomb structure, which comprises a firing step of firing a precursor of honeycomb structure having a large number of through-holes divided by partition walls and extending in the axial direction, characterized in that the precursor contains a Si phase and the firing step is conducted using a furnace material free from any boron-containing compound (the second aspect).

The present invention provides thirdly a process for producing a honeycomb structure, which comprises a firing step of firing a precursor of honeycomb structure having a large number of through-holes divided by partition walls and extending in the axial direction, characterized in that a reduction percentage of Si content in Si phase after firing step relative to Si content in Si phase before firing step is suppressed at 10% by mass or less (the third aspect).

In the third aspect of the present invention, the firing step is preferred to be conducted using a furnace material containing no carbonaceous material. In the second or third invention, the furnace material is preferred to be a material composed mainly of at least one kind of component selected from alumina, silicon carbide, oxide-bonded silicon carbide, silicon nitride-bonded silicon carbide and molybdenum disilicide.

BRIEF DESCRIPTION OF THE DRAWINGS

FIG. 1 is a schematic perspective view showing one form of a honeycomb structure.

FIG. 2(a) is a schematic perspective view showing other form of a honeycomb structure, and FIG. 2(b) is a schematic enlarged top view showing the b portion of FIG. 2(a).

BEST MODE FOR CARRYING OUT THE INVENTION

Figure 3A:
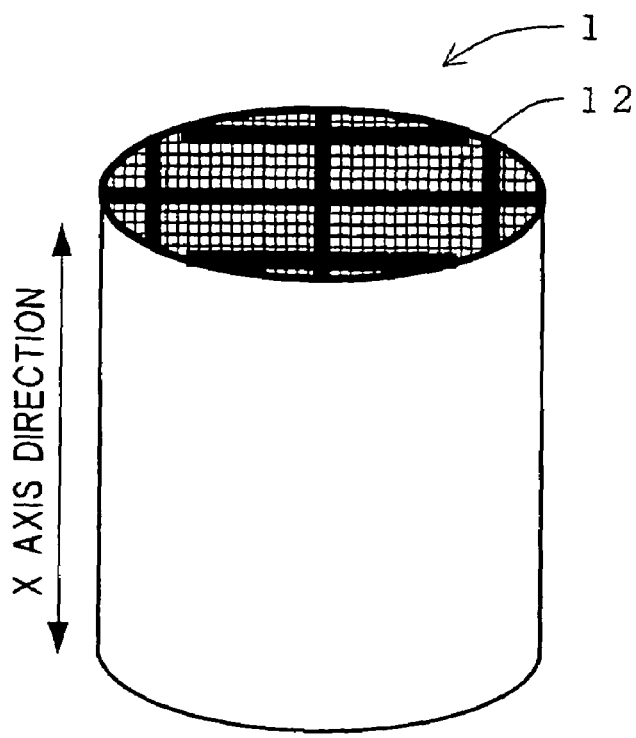
FIG. 3(a) is a schematic perspective view showing other form of a honeycomb structure.

The honeycomb structure and the process for producing a honeycomb structure, both according to the present invention are described in detail below. However, the present invention is not restricted to the following modes. Incidentally, in the following, the term "section" means a section perpendicular to the lengthwise direction (X-axis direction) of through-holes, unless otherwise specified.

The honeycomb structure of the first aspect of the present invention is, as shown in, for example, FIG. 1, a honeycomb structure 1 having a large number of through-holes 3 divided by partition walls 2 and extending in the X-axis direction of the structure. The important characteristic of the first aspect lies in that the honeycomb structure contains a Si phase having a lattice constant controlled at 0.54302 to 0.54311 nm at room temperature. The honeycomb structure containing a Si phase having a lattice constant controlled in the above range can exhibit a high thermal conductivity stably and, when used as a DPF, can exhibit a high upper limit for soot.

For example, a honeycomb structure made of a Si—SiC type material are superior in heat resistance, thermal shock resistance, oxidation resistance, and corrosion resistance to acid, alkali or the like; however, the thermal conductivity thereof has been far lower than the value calculated from pure metallic silicon and silicon carbide. The reason therefor was investigated in detail and, as a result, it was found that in conventional materials containing a Si phase, for example, a Si—SiC type material, the lattice constant of the Si phase is lower than the value of pure metallic silicon reported in literature; and it was further found that by controlling the lattice constant of the Si phase at 0.54302 to 0.54311 nm, a very high thermal conductivity can be obtained. Here, the term "Si phase" means a phase composed mainly of Si and, for example, a metallic Si phase falls thereunder.

In order to control the lattice constant of Si phase in the above range, it is preferred that the Si phase contains boron (B) in an amount of 0.02% by mass or less.

Honeycomb structures made of a Si phase-containing material, for example, a Si—SiC type material have been produced by molding a raw material containing metallic silicon and silicon carbide into a honeycomb material and then firing the material at a predetermined temperature. However, the honeycomb structures obtained were found to contain boron in the Si phase.

The firing of a metallic silicon-containing material has been conducted in a furnace using, as the sagger material or the furnace wall material, a SiC material containing boron nitride (BN), boron carbide ($B_4C$) and a carbonaceous material each in an amount of about 1% by mass, which are known to prevent a reaction with metallic silicon, or a carbonaceous material having boron nitride coated as a reaction-preventing layer. The presence of boron in the honeycomb structure obtained is considered to be due to the movement of boron in boron-containing substance (e.g. BN), into Si phase during firing, and it was found that this presence of boron is a cause of reduction in lattice constant of Si phase. It was further found that by controlling the boron content in Si phase at 0.02% by mass or less, the reduction in lattice constant can be prevented effectively and a high thermal conductivity can be obtained. The reason is presumed to be that in the thermal conductivity in Si, phonon is considered to play a major role and, when the boron content is more than 0.02% by mass, boron moves into the Si phase to form a solid solution and the anharmonicity of the lattice vibration of the solid solution gives a reduced thermal conductivity. The honeycomb structure of the first aspect of the present invention is preferred to contain refractory particles besides a Si phase and is preferred to contain, as a main component, Si or a Si-refractory particles composite material. Here, the term "main component" refers to a component constituting 50% by mass or more of the honeycomb structure. As preferred refractory particles, there are mentioned particles of $Al_2O_3$, $ZrO_2$, $Y_2O_3$ (oxides); SiC (carbide); $Si_3N_4$, AlN (nitrides); mullite; and so forth. SiC is preferred in order to secure a high thermal conductivity and a high thermal shock resistance. That is, the honeycomb structure is preferred to contain, as a main component, a Si—SiC type material.

The honeycomb structure of the first aspect of the present invention is preferred to be a porous material because such a honeycomb structure can be suitably used in a filter, a catalyst carrier, etc. Too large a porosity is not preferred because of insufficient strength, and too small a porosity is not preferred because of large pressure loss when used particularly as a filter. The porosity is preferred to be in a range of 30 to 90% by volume. In order to obtain a porous honeycomb structure, it is preferred that the Si phase functions as a binder and bonds the refractory particles to each other.

When the honeycomb structure contains, as a main component, a Si—SiC type composite material and when the Si content specified by Si/(Si+SiC) is too small, there is a shortage of binder; therefore, bonding of adjacent SiC particles to each other via Si phase is insufficient, which not only invites a reduction in thermal conductivity but also makes it difficult to obtain a strength necessary for maintenance of a thin-wall structure such as honeycomb structure. Conversely, too large a Si content is not preferred because metallic silicon is present in an amount more than necessary for appropriate bonding of SiC particles to each other, which invites excessive shrinkage of honeycomb structure in firing and incurs problems such as reduction in porosity, reduction in average pore diameter, and the like. Therefore, the Si content is preferably 5 to 50% by mass, more preferably 10 to 40% by mass.

In the honeycomb structure of the first aspect of the present invention, there is no particular restriction as to the thickness of partition wall. However, too large a thickness of partition wall is not preferred because it gives a large pressure loss when a to-be-treated fluid passes through porous partition walls; and too small a thickness of partition wall is not preferred because it gives an insufficient strength. The thickness of partition wall is preferably 30 to 2,000 µm, more preferably 40 to 1,000 µm, most preferably 50 to 500 µm. There is no particular restriction, either, as to the cell density (the number of through-holes per unit sectional area). However, too small a cell density results in insufficient strength and insufficient effective GSA (geometrical surface area) of filter; and too large a cell density results in a large pressure loss when a to-be-treated fluid passes. The cell density is preferably 6 to 2,000 cells/in.$^2$ (0.9 to 311 cells/cm$^2$), more preferably 50 to 1,000 cells/in.$^2$ (7.8 to 155 cells/cm$^2$), most preferably 100 to 400 cells/in.$^2$ (15.5 to 62.0 cells/cm$^2$). There is no particular restriction, either, as to the sectional shape of through-hole (the cell shape). However, the shape is preferred to be any of a triangle, a tetragon, a hexagon and a corrugation from the standpoint of production. There is no particular restriction, either, as to the sectional shape of honeycomb structure. The shape can be a circle as shown in, for example, FIG. 1, an oval, a race track shape, an ellipse, a polygon (e.g. triangular, almost triangular, tetragonal or almost tetragonal), or an odd shape.

When the honeycomb structure of the first aspect of the present invention is used particularly as a DPF, it is preferred that predetermined through-holes 3 are plugged at one end 42 of the structure and remaining predetermined through-holes 3 are plugged at other end 44 of the structure, as shown in FIGS. 2(a) and 2(b). It is particularly preferred that all through-holes are plugged at either end, and it is further preferred that each through-hole 3 is plugged at either end of the hole and adjacent through-holes 3 are plugged alternately at each end of the structure so that the both ends 42 and 44 of the structure look a checkerboard pattern. By plugging the through-holes as above, a to-be-treated fluid entering from, for example, one end 42 passes through partition walls 2 and leaves from other end 44; the porous partition walls 2 function as a filter when the to-be-treated fluid passes therethrough, and can remove an intended substance. As the material used for plugging, there can be suitably used at least one kind of material selected from those mentioned above as the preferred main component of honeycomb structure.

Figure 3B:
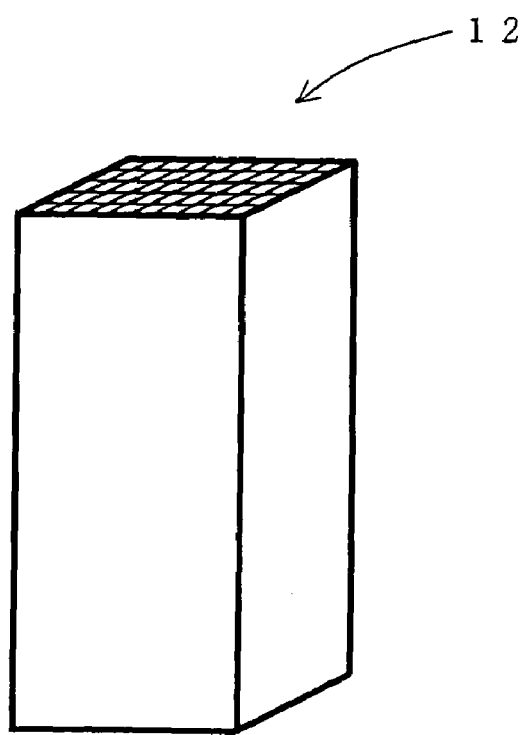
FIG. 3(b) is a schematic perspective view showing a honeycomb segment.

In the first aspect of the present invention, it is also preferred to constitute the honeycomb structure 1 in a form in which a plurality of segments 12 are bonded, as shown in FIGS. 3(a) and 3(b), because such a form can have a further improved thermal shock resistance. In this case, there is no restriction as to the size of segment. However, too large a size of each segment is not preferred because the effect of improvement in thermal sock resistance is small; and too small a size is not preferred because production of each segment and bonding thereof into one piece are complicated. As to the size of honeycomb segment, the sectional area is preferably 900 to 10,000 mm$^2$, more preferably 900 to 5,000 mm$^2$, most preferably 900 to 3,600 mm$^2$. It is preferred that at least 70% by volume of the honeycomb structure is constituted by honeycomb segments of this size. There is no particular restriction as to the shape of each segment. However, as an example, a honeycomb segment 12 having a tetragonal sectional shape, that is, a quadrangular pyramid shape as shown in FIG. 3(b) is used as a basic segment shape, and the shapes of honeycomb segments to be located at the periphery of integrated honeycomb structure can be appropriately selected so as to match the shape of the integrated honeycomb structure.

It is preferred that the honeycomb structure of the first aspect of the present invention is loaded with a catalyst, for example, a metal having a catalytic activity when the honeycomb structure is intended to be used as a catalyst carrier for purification of an exhaust gas emitted from a heat engine (e.g. an internal combustion engine) or a burner (e.g. a boiler), or for reforming of a liquid fuel or a gaseous fuel.

As representatives of the metal having a catalytic activity, there are mentioned Pt, Pd, Rh, etc. It is preferred to load at least one kind of these on the honeycomb structure.

Next, description is made on the second aspect of the present invention, i.e. the process for producing a honeycomb structure.

The main characteristic of the second aspect of the present invention lies in that a Si phase-containing precursor of honeycomb structure is fired using a furnace material free from any boron-containing compound such as BN or the like. Since contact between Si phase and boron can be prevented thereby, formation of a solid solution containing boron can be prevented, the lattice constant of Si phase can be controlled in a predetermined range, and a reduction in thermal conductivity of honeycomb structure can be prevented.

In the second aspect of the present invention, the term "furnace material" means a material constituting surfaces in contact with a space inside a firing furnace which a precursor is placed, and it is necessary that the materials constituting these surfaces contain substantially no boron. Specifically, it is necessary that the materials constituting the surfaces of the furnace inner wall and the articles placed in the space inside the furnace, such as sagger (in which the precursor is to be placed), heater and the like contain substantially no boron. When these surfaces contain no boron-containing compound, the amount of boron moving into Si phase can be suppressed and the effects of the present invention can be exhibited.

Next, description is made on the third aspect of the present invention, i.e. the process for producing a honeycomb structure.

The main characteristic of the third aspect of the present invention lies in that in the firing step, the reduction percentage of Si content in Si phase after firing step relative to 100% by mass of Si content in Si phase before firing step is suppressed at 10% by mass or less, preferably at 5% by mass or less, more preferably at 2% by mass or less. In a honeycomb structure in which the Si phase has a role of a heat-conducting path, evaporation of Si leads to a decrease in the heat-conducting path and accordingly a reduction in thermal conductivity. Therefore, by suppressing Si evaporation according to the above constitution, about the same Si amount as compounded can be maintained and the reduction in thermal conductivity can be suppressed.

In order to suppress the reduction in Si content, it is preferred to conduct the firing step using a furnace material containing no carbonaceous material. As already described in the explanation of the first aspect, a carbonaceous material has been used as a furnace material. However, particularly in the high-temperature firing of 1,000° C. or more, the carbonaceous material as a furnace material reacts with Si which evaporates from a to-be-fired material to form silicon carbide, which has accelerated the evaporation of Si from the to-be-fired material. Hence, by using a furnace material free from any carbonaceous material in order to prevent rapid evaporation of Si from to-be-fired material, Si evaporation can be suppressed.

Here, the term "furnace material", as described in the explanation of the second aspect, means materials constituting the surfaces in contact with an inside-firing-furnace space in which a precursor is placed. The term "carbonaceous material" means a material constituted mainly by C—C bond, such as graphite or the like, and the carbonaceous material does not include a material constituted mainly by a bond between carbon and other element, for example, silicon carbide.

In the second or third aspect of the present invention, the furnace material is preferably a material composed mainly of at least one kind of component selected from alumina, silicon carbide, oxide-bonded silicon carbide, silicon nitride-bonded silicon carbide and molybdenum disilicide, from the standpoints of heat resistance, etc. Specifically, there is preferred, for the furnace inside wall or the sagger, a material such as alumina fiber, silicon carbide, oxide-bonded silicon carbide, silicon nitride-bonded silicon carbide or the like and, for the heater, a material such as silicon carbide, molybdenum disilicide or the like. Here, "oxide-bonded silicon carbide" is a material obtained by sintering silicon carbide particles using, as a binder, an oxide such as clay or the like.

In the second or third aspect of the present invention, there is no particular restriction as to the method for forming a Si phase-containing precursor of honeycomb structure. The precursor can be formed by, for example, the following method.

For example, metallic silicon and a silicon carbide powder are used as a raw material. Thereto are added a binder, for example, methyl cellulose and hydroxypropoxymethyl cellulose. Further, a surfactant and water are added to produce a plastic puddle. This puddle is subjected to extrusion molding to obtain a molded material of honeycomb structure, having a large number of through-holes divided by partition walls and extending in the axial direction of the precursor. Preferably, the molded material is dried using, for example, a microwave and/or hot air and then subjected to debinding with heating in, for example, a $N_2$ atmosphere, whereby a Si phase-containing precursor can be obtained.

Such a precursor is fired using the above-mentioned furnace, in an inert atmosphere, for example, an argon atmosphere at a predetermined temperature, for example, 1,400 to 1,800° C., whereby a honeycomb structure can be produced. With too low a firing temperature, the Si phase melts, making difficult the bonding of refractory particles to each other. With too high a firing temperature, prevention of Si evaporation is difficult even in the third aspect.

In the second or third aspect of the present invention, the honeycomb structure may be loaded with a catalyst. Loading of catalyst may be conducted by a method ordinarily used by those skilled in the art. Catalyst loading can be conducted, for example, by wash-coating of catalyst slurry and subsequent drying and firing. This step may be conducted at any timing if it is conducted after formation of the molded material. Also, plugging of through-holes may be conducted. Through-hole plugging can be conducted, for example, by masking through-holes not to be plugged, applying a raw material for plugging material, prepared in a slurry state, to each end of each honeycomb segment, and conducting drying and firing. There is no particular restriction as to the raw material for plugging material, but the raw material is preferably the same as the raw material used for precursor formation.

The present invention is hereinafter described specifically by way of Examples. However, the present invention is in no way restricted by these Examples.

EXAMPLES AND COMPARATIVE EXAMPLES (Production of Honeycomb Segments)

100 parts by mass of a raw material, i.e. a total of 75% by mass of a SiC powder having an average diameter of 50.0 μm and 25% by mass of a metallic Si powder having an average diameter of 4 μm was mixed with 5 parts by mass of a hole-making agent, i.e. a poly(methyl methacrylate) having an average diameter of 12 μm. Thereto were added methyl cellulose, hydroxypropoxymethyl cellulose, a surfactant and water to produce a plastic puddle. This puddle was subjected to extrusion molding, and the extrudate was dried using a microwave and hot air to obtain a molded material of honeycomb structure having a partition wall thickness of 380 μm, a cell density of about 31.0 cells/cm$^2$ (200 cells/in.$^2$), a square section of 35 mm×35 mm, and a length of 152 mm. Using the same material as used in production of the molded material, each through-hole of the molded material was plugged at either end of the hole so that adjacent through-holes were plugged alternately at each end of the molded material and each end of the molded material looked a checkerboard pattern. The resulting molded material was dried and then subjected to debinding at about 400° C., to obtain a precursor.

Using a sagger material, a furnace inside wall material and a heater material, all shown in Table 1, the precursor was fired in an inert atmosphere under the conditions of 1,450° C. and 2 hours, to obtain honeycomb structures. As to the Si phase, i.e. metallic silicon of each honeycomb structure, its lattice constant was calculated by a WPPD method from the diffraction profile obtained by X-ray diffractometry. The boron content in the Si phase was calculated by an ICP method after extraction of metallic silicon alone by solution treatment; the Si content after firing was measured by preparation of a calibration curve and subsequent fluorescent X-ray method; and the change percentage before and after firing was determined by calculation to use it as a reduction percentage Si content in Si phase. The thermal conductivity was measured by a laser flash method. The results of these measurements and calculations are shown in Table 1. The porosity of each honeycomb structure, which is not shown in Table, was measured by an Archimedes method and was in a range of 44 to 46%.

TABLE 1

|  | Sagger material | Furnace inside Material | Heater Material | Lattice constant of Si phase [nm] | Boron content in Si phase [mass %] | Reduction percentage of Si content in Si phase [mass %] | Thermal conductivity [W/mK] |
|---|---|---|---|---|---|---|---|
| Example 1 | Alumina | Alumina | SiC | 0.54309 | 0.01 | 1 | 35 |
| Example 2 | Alumina | Alumina | MoSi$_2$ | 0.54308 | 0.012 | 1 | 34 |
| Example 3 | SiC | Alumina | SiC | 0.54305 | 0.01 | 1 | 31 |
| Example 4 | Boron nitride-coated carbon | Alumina | SiC | 0.54295 | 0.03 | 2 | 25 |

TABLE 1-continued

|  | Sagger material | Furnace inside Material | Heater Material | Lattice constant of Si phase [nm] | Boron content in Si phase [mass %] | Reduction percentage of Si content in Si phase [mass %] | Thermal conductivity [W/mK] |
|---|---|---|---|---|---|---|---|
| Example 5 | Boron nitride-coated carbon | Boron nitride-coated Carbon | Carbon | 0.54293 | 0.043 | 1 | 24 |
| Example 6 | Boron nitride | Alumina | SiC | 0.54293 | 0.04 | 1 | 24 |
| Example 7 | Alumina | Alumina | Carbon | 0.54308 | 0.008 | 12 | 25 |
| Example 8 | Alumina | Carbon | Carbon | 0.54308 | 0.009 | 15 | 25 |
| Example 9 | Carbon | Carbon | Carbon | 0.54308 | 0.01 | 20 | 24 |
| Comparative Example 1 | Boron nitride-coated carbon | Carbon | Carbon | 0.54293 | 0.043 | 20 | 18 |
| Comparative Example 2 | Boron nitride | Carbon | Carbon | 0.54293 | 0.038 | 20 | 16 |

As shown in Table 1, the samples obtained by firing using the furnace materials of Examples 7 to 9 had the same composition as the sample obtained by firing using the furnace material of Comparative Example 1 or 2; however, the lattice constants of Si phase in the former samples were in the range of the first aspect and the thermal conductivities of the former samples were higher than that of Comparative Example 1 or 2 whose lattice constant was outside the range of the first aspect. The samples obtained by firing using the furnace materials of Examples 4 to 6 were suppressed in the reduction percentage of Si content and therefore had higher thermal conductivities than that of the sample of Comparative Example 1 or 2. The samples of Examples 1 to 3 were in the range of the first aspect of the present invention in the lattice constant and in the range of the third aspect of the present invention in the reduction percentage of Si content, showed very high thermal conductivities of 30 W/mK or more, and are particularly preferred as a honeycomb structure for use as a base material of DPF.

INDUSTRIAL APPLICABILITY

As described above, in the honeycomb structure according to the first aspect of the present invention, the Si phase has a lattice constant controlled at 0.54302 to 0.54311 nm; therefore, a honeycomb structure with very high thermal conductivity and high thermal shock resistance was obtained. According to the second or third aspect of the present invention, a honeycomb structure with high thermal conductivity could be produced. The honeycomb structure of the present invention is used particularly suitably in DPF; however, its applications are not restricted to DPF alone because the effect of the present invention lies in achieving an increased thermal conductivity to prevent excessive temperature increase and uniformize the structure-inside temperature distribution.

The invention claimed is:

1. A honeycomb structure having a large number of through-holes divided by partition walls and extending in the axial direction, characterized in that the honeycomb structure contains a Si phase having a lattice constant controlled at 0.54302 to 0.54311 nm at room temperature.

2. A honeycomb structure according to claim 1, wherein the Si phase contains boron in an amount of 0.02% by mass or less.

3. A honeycomb structure according to claim 1, further containing refractory particles as an aggregate.

4. A honeycomb structure according to claim 3, wherein the refractory particles are SiC.

5. A honeycomb structure according to claim 1, which is porous.

6. A process for producing a honeycomb structure, which comprises a firing step of firing a precursor of honeycomb structure having a large number of through-holes divided by partition walls and extending in the axial direction, characterized in that the precursor contains a Si phase and the firing step is conducted using a furnace material free from any boron-containing compound.

7. A process for producing a honeycomb structure, which comprises a firing step of firing a precursor of honeycomb structure having a large number of through-holes divided by partition walls and extending in the axial direction, characterized in that a reduction percentage of Si content in Si phase after firing step relative to Si content in Si phase before firing step is suppressed at 10% by mass or less.

8. A process for producing a honeycomb structure according to claim 7, wherein the firing step is conducted using a furnace material containing no carbonaceous material.

9. A process for producing a honeycomb structure according to claim 8, wherein the furnace material is a material composed mainly of at least one kind of component selected from alumina, silicon carbide, oxide-bonded silicon carbide, silicon nitride-bonded silicon carbide and molybdenum disilicide.

* * * * *